(12) United States Patent
Bowditch

(10) Patent No.: US 6,976,334 B1
(45) Date of Patent: Dec. 20, 2005

(54) OUTDOOR PLANTER SYSTEM

(76) Inventor: Mark L. Bowditch, 6 Holly St., Norton, MA (US) 02766-1021

( * ) Notice: Subject to any disclaimer, the term of this patent is extended or adjusted under 35 U.S.C. 154(b) by 36 days.

(21) Appl. No.: 10/453,266

(22) Filed: Jun. 4, 2003

(51) Int. Cl.[7] .......................... A01G 9/12; A01G 13/00
(52) U.S. Cl. .............. 47/32; 47/31.1; 47/45; 47/29.1
(58) Field of Search ................. 47/20.1, 31.1, 47/31, 32, 32.4, 45, 29.1, 29.2, 33; 135/16

(56) References Cited

U.S. PATENT DOCUMENTS

| | | | |
|---|---|---|---|
| 44,238 A * | 9/1864 | Towne | 43/108 |
| 135,173 A | 1/1873 | Timby | |
| 223,892 A * | 1/1880 | Delany | 47/32 |
| 313,424 A * | 3/1885 | Hughes | 47/32 |
| 760,879 A | 5/1904 | Kunzman | |
| 1,739,426 A * | 12/1929 | Stripling | 47/31 |
| 3,005,287 A | 10/1961 | Dudley | |
| 3,755,965 A * | 9/1973 | Emery | 47/48.5 |
| 3,803,759 A * | 4/1974 | Heinecke | 47/47 |
| 3,896,586 A | 7/1975 | Caldwell | |
| 4,160,340 A | 7/1979 | Levett | |
| 4,268,992 A * | 5/1981 | Scharf, Sr. | 47/32.4 |
| 4,308,688 A * | 1/1982 | Revane | 47/32.7 |
| 4,348,831 A | 9/1982 | Chambers | |
| 4,392,326 A | 7/1983 | Boria | |
| 4,642,938 A | 2/1987 | Georges et al. | |
| 4,648,203 A * | 3/1987 | Worzek | 47/32 |
| 4,934,093 A | 6/1990 | Yanna | |
| 4,986,025 A | 1/1991 | Imperial | |
| 5,647,169 A | 7/1997 | Bui | |
| 5,918,411 A | 7/1999 | Hadrava | |
| D413,495 S * | 9/1999 | Carter | D8/1 |
| 6,061,952 A | 5/2000 | Palmer | |
| 6,536,158 B2 * | 3/2003 | Rice | 47/32.4 |

FOREIGN PATENT DOCUMENTS

RU 2113783 C1 * 6/1998 .......... A01C 21/00

* cited by examiner

Primary Examiner—Son T. Nguyen
(74) Attorney, Agent, or Firm—John P. McGonagle

(57) ABSTRACT

An outdoor planter system with a central opening through which a plant may grow. The planter portion surrounding the central opening is inwardly and downwardly sloped, generally impervious to liquid and light, and thereby directs liquid to the central opening while simultaneously preventing undesirable growth of weeds and the like about a central plant. The outer perimeter of the planter has several keyways for removably attachment of a planter cover. The keyways are also adapted to receive plant growing or animal protection cages.

11 Claims, 5 Drawing Sheets

OUTDOOR PLANTER SYSTEM

BACKGROUND OF THE INVENTION

This invention relates to the field of planters, and in particular, to a planter system for outdoor plants.

The present invention is a garden and landscaping apparatus which solves several common problems encountered in the care of plants. Water is becoming an increasingly scarce, and therefore, valuable, commodity. Typical plant watering methods are wasteful in that an area is watered rather than specific plantings. This results in watering adjacent and surrounding land beyond a plant's root system. Consequently, not only is water wasted, but the growth of undesired adjacent plants, i.e., weeds, is also encouraged. In the past, this has not been a problem where water and labor have been plentiful. This is no longer the case today. Water is becoming a scarce commodity. With sky-rocking water costs to the average gardener and home owner, the economic feasibility of gardening requires drastic changes in gardening practices.

Historically, one way to combat water wastage in gardening has been to grow a plant in a pot rather than in a field. Pot growing also substantially eliminates problems from weeds. Major disadvantages to the use of growing pots includes the cost of a growing pot and also the problems associated with a growing pot having enough room to allow a plant to develop a full root system. The larger the growing pots, the more costly they become. The costs of the growing pots, therefore, off-sets the economic advantages of water conservation. Field grown plants eliminate the cost of growing pots as well as the artificial limitations on a plant's root system. However, field grown plants are wasteful of water resources and have substantial weed problems.

The use of enclosures which surround plants, and other temporary enclosures has been heretofore proposed. The enclosures are generally planar and provide weed suppression and plant protection. The enclosures of the prior art generally have a raised ring formed about a central opening. The ring provides protection for a central plant but actually makes it difficult for the plant to receive water as the ring acts as a liquid barrier. To overcome this problem, many of the prior art planar enclosures have perforations formed therein wherein liquid can then reach the covered ground. However, this defeats the purpose of the planar enclosure in that weeds now receive liquid and can grow through the perforations.

Another problem with prior art enclosures is the difficulty in using plant covers. It is desirable from time to time to use covers over growing plants. The covers protect against adverse weather conditions and extreme temperatures. The few prior art enclosures available rest a temporary simple cover or permanently attach a cover to the enclosure. The temporary covers easily slide off or are blown off by wind. The permanent covers simply cannot be removed or are very difficult to remove.

Another problem with prior art enclosures is the difficulty in using wire growing or wire protective cages. Certain types of plants require a growing cage for supporting growth, such as tomatos, string beans, cucumbers, and the like. Other types of plants require a protective cage against predators, such as squirrels, rabbits, and deer. Applicant is not aware of any prior art enclosures which may be used in conjunction with a wire cage.

SUMMARY OF THE INVENTION

The present invention addresses the above problems by providing an outdoor planter system with a central opening through which a plant may grow. The planter portion surrounding the central opening is inwardly and downwardly sloped, generally impervious to liquid and thereby directing liquid to the central opening while simultaneously preventing undesirable growth of weeds and the like about a central plant. The outer perimeter of the planter has several keyways for removably attaching a planter cover. The keyways are also adapted to receive plant growing or animal protection cages.

The present invention saves water, reduces weeds, and provides savings in the use of liquid fertilizers. Plants can be started from seed or seedlings can be planted directly within the planter system.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

DETAILED DESCRIPTION OF INVENTION

Figure 1:
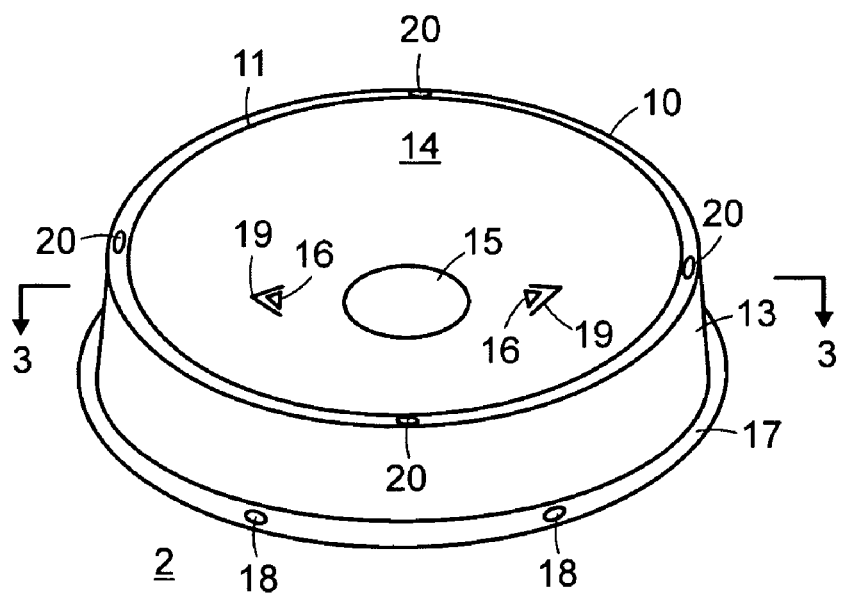
FIG. 1 is a front perspective view of the base unit of the present invention.
Figure 2:
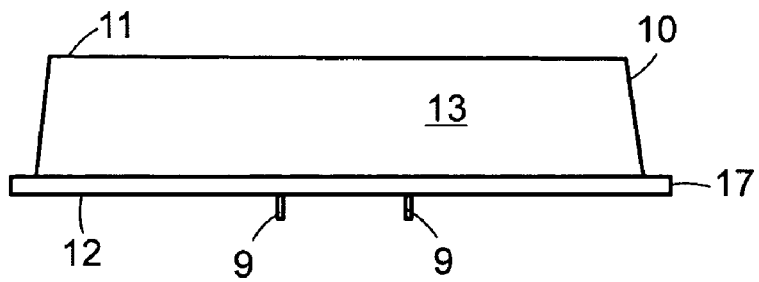
FIG. 2 is a side view of the base unit.
Figure 3:
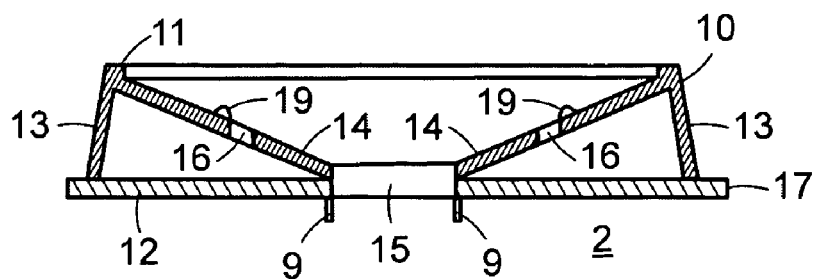
FIG. 3 is a vertical cross section view of the base unit.
Figure 4:
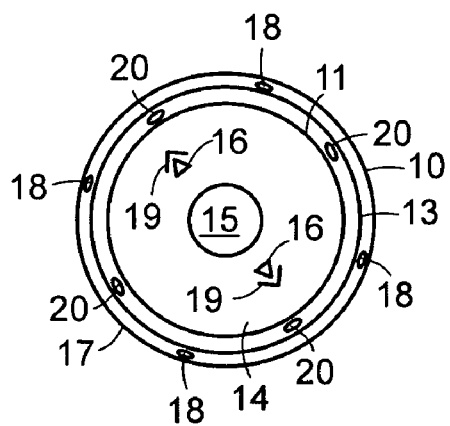
FIG. 4 is a top view of the base unit.
Figure 5:
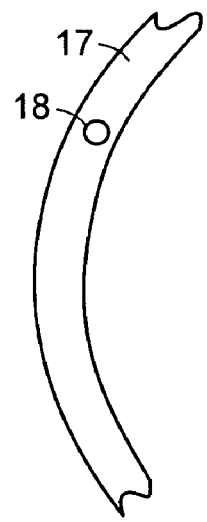
FIG. 5 is a top section view of the base unit outer flange.
Figure 6:
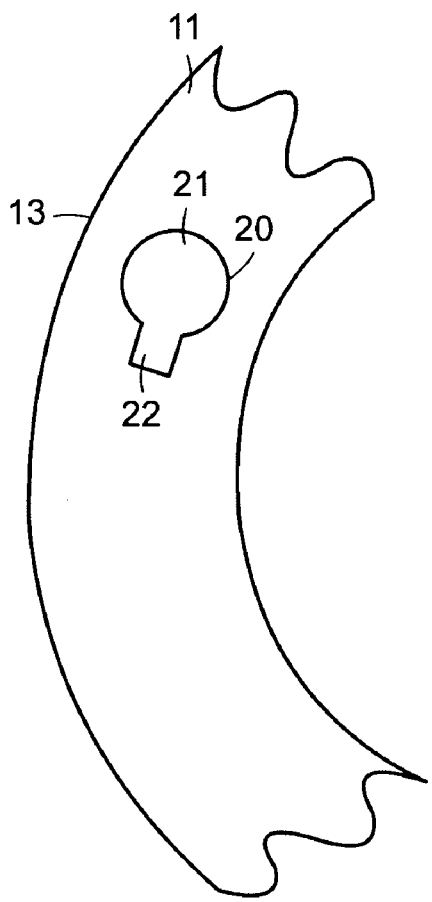
FIG. 6 is a top section view of the base unit upper rim with key way shown.
Figure 7:
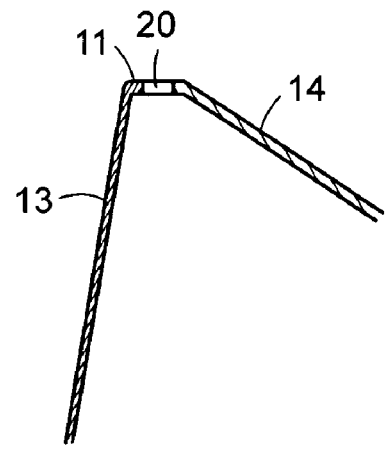
FIG. 7 is a cross section view of a portion of the upper rim.

Referring to the drawings in detail wherein like elements are indicated by like numerals, there is shown an outdoor planter system constructed according to the principles of the present invention. The planter system is comprised of a base unit 10, a cover 30 removably attached to said base unit 10, a growing wire cage 40 removably attached to said base unit 10, and a protective wire cage 50 removably attached to said base unit 10.

Referring more particularly to FIGS. 1 through 4 there is shown the invention base unit 10. In the embodiment shown the base unit 10 is circular, but could be rectangular in another embodiment. The base unit 10 has a top 11, a bottom 12, and a generally vertical perimeter wall 13. An inverted frusto-conical element 14 downwardly slopes from the perimeter wall 13 at the base unit top 11 to a base unit central opening 15. The base unit 10 may be made from any durable, corrosion-resistant material, such as plastic, fiber glass, stainless steel, etc. The base unit 10 has two primary functions. The first function is to collect water, either from rain, sprinkler or hand held hose, and direct it to the central opening 15 in which a plant is positioned. The downwardly sloping, inverted frusto-conical element 14 is impervious to liquids and light and covers a large area relative to the central opening 15 in which a plant is planted. This greatly reduces the waste of water which would otherwise run-off or be absorbed by an area of ground in which no plants are located. To prevent puddling at the central opening 15 in the case of heavy rains, downpours and the like, two small triangular apertures 16 may be formed in the element 14 a desired distance between the central opening 15 and the perimeter wall 13 to allow drainage of excess water. The apertures 16 may each have a small barrier 19 along the element up-slope side, toward the perimeter wall 13, whereby normal water flow is directed to either side of the aperture 16.

The second function of the base unit 10 is to block weed growth. The downwardly sloping, inverted frusto-conical element 14 blocks sunlight and water from the area beneath it, thereby eliminating the ability of weeds to grow beneath it. To prevent water seepage and weed growth, the central opening 15 has a downwardly extending flange 9 adapted to dig into the ground 2 a desired depth when the base unit 10 is positioned on the ground. The flange 9 also stabilizes and anchors the base unit 10 to a particular spot.

The base unit 10 has a circumferential flange 17 extending outwardly from the perimeter wall 13 at the base unit bottom 12. The flange 17 has a four openings 18 formed therein, equidistantly about the perimeter wall 13. The flange openings 18 are adapted to receive stakes (not shown) for fastening the base unit 10 into the ground 2.

Referring more particularly to FIGS. 4 through 7, The base unit 10 has four keyway openings 20 in the perimeter wall 13 at the base unit top 11. The keyway openings 20 are equidistantly positioned about the base unit perimeter. Each keyway opening 20 is comprised of a circular portion 21 merged into a rectangular portion 22. The circular portion 21 has a radial diameter coincident with a longitudinal axis of the rectangular portion 22. The circular portion 21 has a radial diameter greater than the transverse axis width of the rectangular portion 22.

Figure 10A:
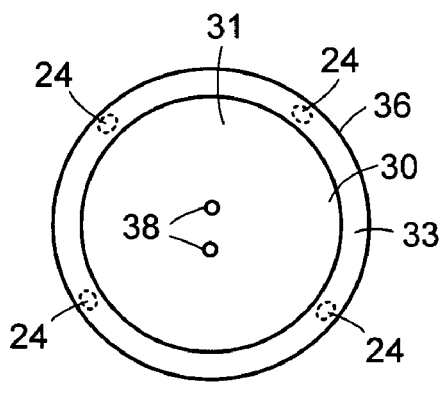
FIG. 10A is a top view of one embodiment of a base unit cover.
Figure 10B:
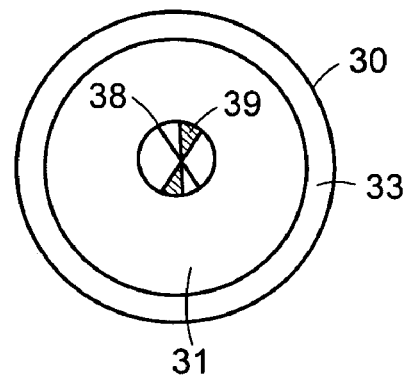
FIG. 10B is a top view of another embodiment of a base unit cover.

The present invention is further comprised of a cover 30 removably attachable to the base unit 10. See FIGS. 8 through 10B. The cover 30 is generally transparent, has a dome shape and acts as a solar dome and/or frost cover for early spring planting in colder climates. A preferred material used for the cover would be a plastic material. The cover central portion 31 is upwardly domed and has two finger apertures 38 formed therein, said apertures 38 providing means for grasping the cover 30 and means for venting the area within the cover 30. See FIG. 10A. In an alternate embodiment, shown in FIG. 10B, the cover central portion 31 may have an aperture 38 formed therein with a slidable lid 39 over said aperture 38 allowing the aperture to be open or closed to ambient environment. The cover 30 has a perimeter 32 terminating in a circumferential outwardly extending flange 33. The cover perimeter 32 will generally match the shape of the base unit 10, e.g., round, rectangular, etc. The cover flange 33 has an upper surface 34 and a bottom surface 35. The flange bottom surface 35 has four downwardly projecting pins 24 fixedly attached thereto, equidistantly about the flange 33. The pins 24 are adapted to fit into the base unit keyways 20. The cover flange 33 has an outer perimeter 36 terminating in a downwardly extending sealing lip 37. The sealing lip 37 is adapted to engage the base unit perimeter wall 13 when the cover 30 is joined to the base unit 10.

Figure 8:
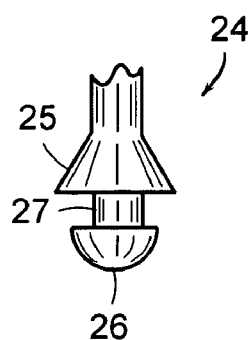
FIG. 8 is a side view, partly in section, of an attachment pin.
Figure 9:
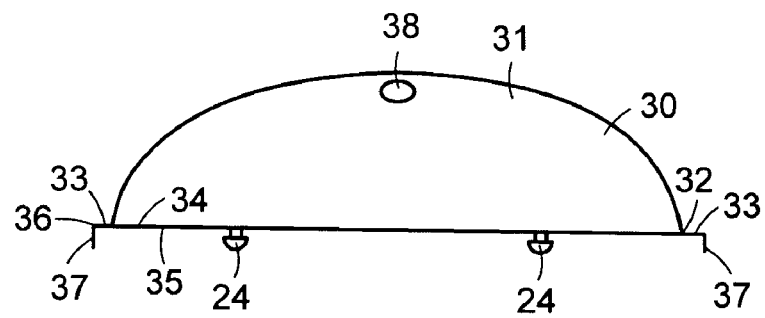
FIG. 9 is a side view of a base unit cover.
Figure 11:
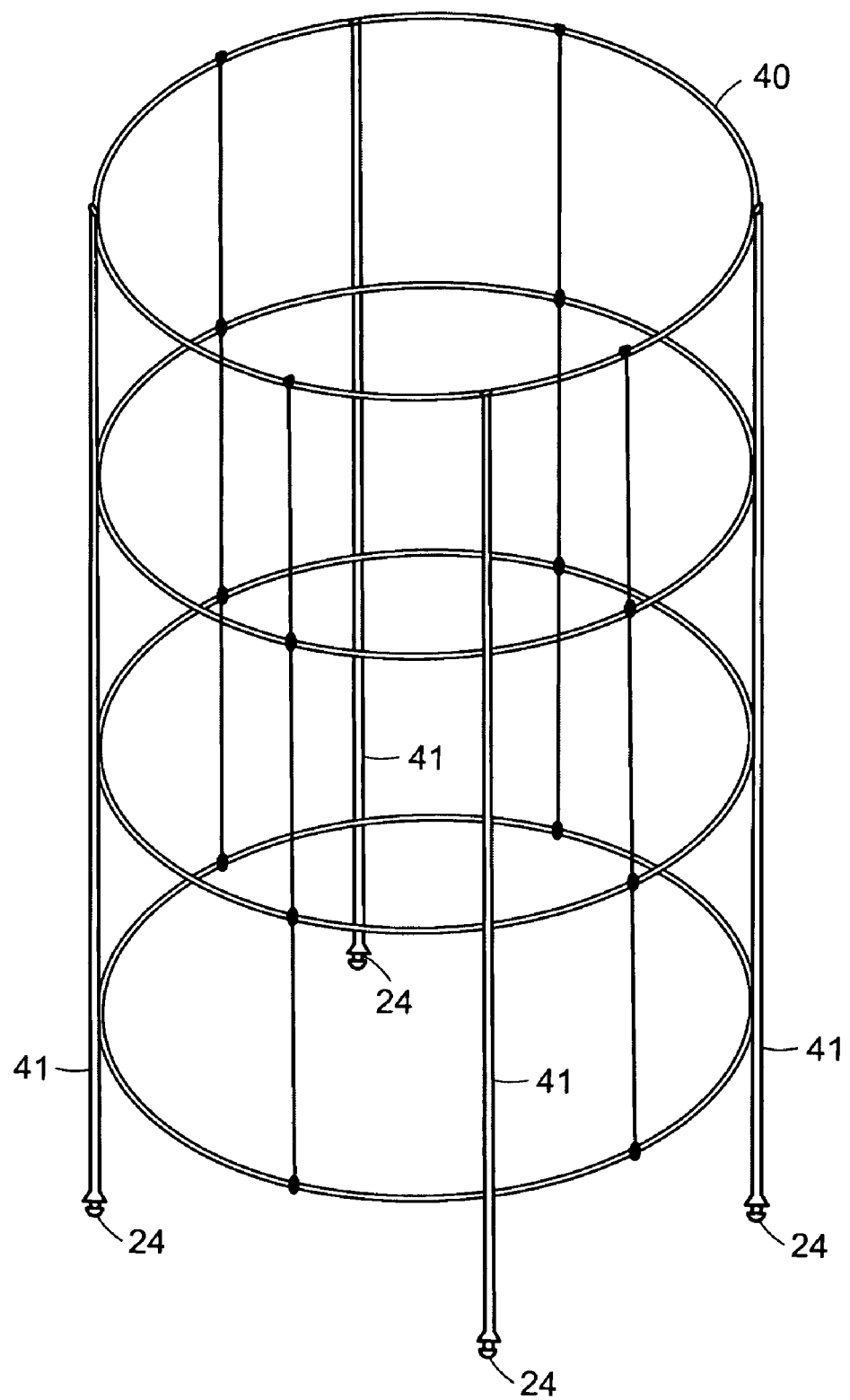
FIG. 11 is a front perspective view of a growing cage adapted for attachment to the base unit.
Figure 12:
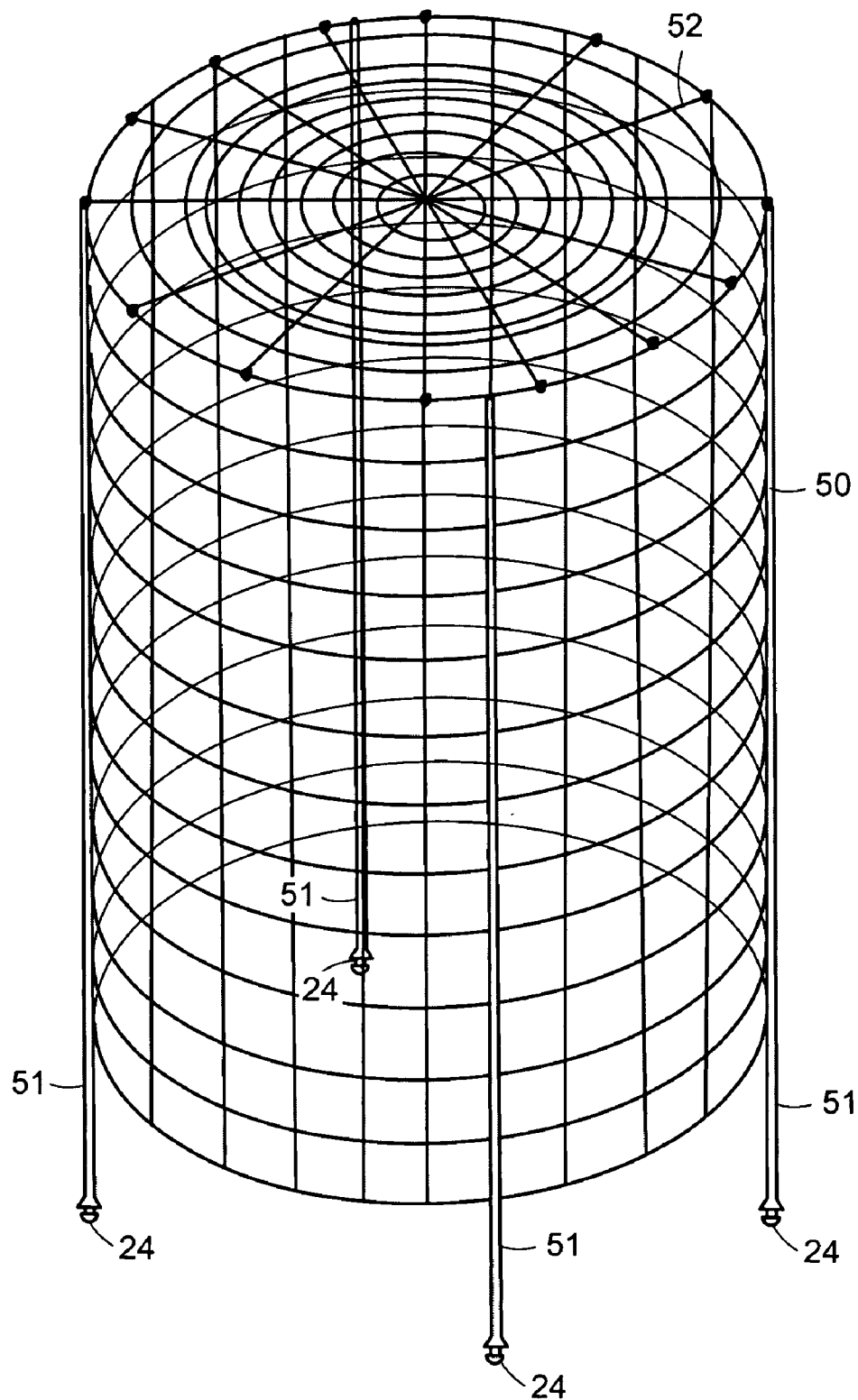
FIG. 12 is a front perspective view of a plant protective cage adapted for attachment to the base unit.

As may be seen in FIGS. 8, 11 and 12, the invention also provides a wire growing cage 40 for vine-like plants, tomatos, and the like, and a wire animal protective cage 50 with a wire top 52. The animal protective cage top 52 may be removable converting the protective cage 50 into a simple growing cage 40. Each cage 40, 50 has four downwardly extending legs 41, 51 terminating in downwardly projecting pins 24 fixedly attached thereto. The pins 24 are adapted to fit into the base unit keyways 20.

Each pin 24 is comprised of an conical upper element 25 attached to a semispheric lower element 26 by means of a short rod element 27, said rod 27 being attached to an upper element 25 flat surface 28 and a lower element 26 flat surface 29, said rod 27 having a radial diameter less than the radial diameter of the flat surface 28 of the pin upper element 25, less than the flat surface 29 of the pin lower element 26, and less than the transverse width of the base unit keyway rectangular portion 22. Each pin lower element 26 is adapted to being inserted into the base unit keyway circular portion 21. The flat 28 surface of the upper element 25 has a diameter greater than the diameter of the base unit keyway circular portion 21 and the transverse width of the base unit keyway rectangular portion 22. The radial diameter of the semispheric lower element 26 is less than the base unit keyway circular portion 21 but greater than the transverse width of the keyway rectangular portion 22. The element 30, 40, 50 to which each pin upper portion 25 is attached is then horizontally rotated, wherein each said pin 24 is slid to the keyway rectangular portion 22, thereby holding each pin 24 within a keyway 20.

It is understood that the above-described embodiment is merely illustrative of the application. Other embodiments may be readily devised by those skilled in the art which will embody the principles of the invention and fall within the spirit and scope thereof. For example, although a keyway system is preferred, other methods for attaching accessories to the base unit may be used, e.g., screw type fasteners.

I claim:

1. An outdoor planter system with a central opening through which a plant may grow, said planter system being positioned on a desired ground, comprising:

a base unit having a top, a bottom, a generally vertical perimeter wall, and an inverted frusto-conical element, impervious to liquids and light, downwardly sloping from the perimeter wall at the base unit top toward the base unit bottom and terminating in said central opening, said base unit having a circumferential flange extending outwardly from the perimeter wall at the base unit bottom, said circumferential flange having a plurality of openings formed therein, equidistantly about the perimeter wall, said circumferential flange openings adapted to receive stakes for fastening the base unit into the ground, said base unit having a plurality of keyway openings in the perimeter wall at the base unit top, said keyway openings being equidistantly positioned about the base unit perimeter, each said keyway opening being comprised of a circular portion merged into a rectangular portion, said circular portion having a radial diameter coincident with a longitudinal axis of the rectangular portion, said circular portion having a radial diameter greater than a transverse axis width of the rectangular portion; and a generally transparent cover removably attached to said base unit, said cover having a dome shape with an upwardly domed central portion and a perimeter terminating in a circumferential outwardly extending flange, said outwardly extending flange having an upper surface and a bottom surface, said flange bottom surface having a plurality of downwardly projecting pins fixedly attached thereto, equidistantly about the outwardly extending flange, said pins corresponding to and adapted to fit into the base unit keyway openings.

2. An outdoor planter system as recited in claim 1, wherein:

said outwardly extending flange has an outer perimeter terminating in a downwardly extending sealing lip, said sealing lip adapted to engage the base unit perimeter wall when the cover is joined to the base unit.

3. An outdoor planter system as recited in claim 2, further comprising:

a wire growing cage with a plurality of downwardly extending legs, each said leg terminating in a downwardly projecting pin fixedly attached thereto, said pins adapted to fit into the base unit keyway openings.

4. An outdoor planter system as recited in claim 3, further comprising:

a wire animal protective cage having a protective cage top and having a plurality of downwardly extending legs, each said leg terminating in a downwardly projecting pin fixedly attached thereto, said pins adapted to fit into the base unit keyway openings.

5. An outdoor planter system as recited in claim 4, wherein:

said wire animal protective cage top is removably attached to said wire animal protective cage.

6. An outdoor planter system as recited in claim 5, wherein:

each said pin is comprised of an conical upper element attached to a semispheric lower element by means of a short rod element, said rod being attached to an upper element flat surface and a lower element flat surface, said rod having a radial diameter less than the radial diameter of the flat surface of the pin upper element, less than the flat surface of the pin lower element, and less than the transverse width of the base unit keyway rectangular portion, each pin lower element adapted to being inserted into the base unit keyway circular portion, said upper element flat surface having a diameter greater than the diameter of the base unit keyway circular portion and the transverse width of the base unit keyway rectangular portion, said semispheric lower element having a radial diameter less than the base unit keyway circular portion and greater than the transverse width of the keyway rectangular portion, each pin lower element is adapted to being inserted into said base unit keyway circular portion and slid to the base unit keyway rectangular portion, thereby holding each pin within a keyway.

7. An outdoor planter system as recited in claim 6, further comprising:

a plurality of apertures formed in the inverted frusto-conical element a desired distance between the central opening and the perimeter wall.

8. An outdoor planter system as recited in claim 7, further comprising:

a small barrier adjacent each said aperture along the inverted frusto-conical element between said aperture and said perimeter wall.

9. An outdoor planter system as recited in claim 8, wherein:

said central opening has a downwardly extending flange adapted to dig into the ground a desired depth when the base unit is positioned on the ground.

10. An outdoor planter system as recited in claim 9, wherein:

said cover domed central portion has a plurality of finger apertures formed therein, said apertures adapted to provide means for grasping the cover and means for venting an area within the cover.

11. An outdoor planter system as recited in claim 9, wherein:

said cover domed central portion has an aperture formed therein with a slidable lid over said aperture adapted to allow the aperture to be open or closed to an ambient environment.

* * * * *